United States Patent
McCutcheon et al.

(10) Patent No.: US 12,422,820 B2
(45) Date of Patent: Sep. 23, 2025

(54) PERFORATIONS IN A MEMBRANE FOR A LATTICE STRUCTURE

(71) Applicant: Peridot Print LLC, Palo Alto, CA (US)

(72) Inventors: James Andrew McCutcheon, Vancouver, WA (US); David C. Woodlock, Vancouver, WA (US)

(73) Assignee: Peridot Print LLC, Palo Alo (CA)

( * ) Notice: Subject to any disclaimer, the term of this patent is extended or adjusted under 35 U.S.C. 154(b) by 397 days.

(21) Appl. No.: 17/995,813

(22) PCT Filed: Jun. 17, 2020

(86) PCT No.: PCT/US2020/038028
§ 371 (c)(1),
(2) Date: Oct. 7, 2022

(87) PCT Pub. No.: WO2021/257065
PCT Pub. Date: Dec. 23, 2021

(65) Prior Publication Data
US 2023/0152779 A1    May 18, 2023

(51) Int. Cl.
*G05B 19/4099* (2006.01)
*B22F 10/80* (2021.01)
*B33Y 50/00* (2015.01)

(52) U.S. Cl.
CPC .......... *G05B 19/4099* (2013.01); *B22F 10/80* (2021.01); *B33Y 50/00* (2014.12); *G05B 2219/49023* (2013.01)

(58) Field of Classification Search
CPC ...... G05B 19/4099; G05B 2219/49023; B22F 10/80; B33Y 50/00; Y02P 10/25
USPC .......................................................... 700/98
See application file for complete search history.

(56) References Cited

U.S. PATENT DOCUMENTS

| 6,261,507 | B1 | 7/2001 | Smalley et al. |
| 10,279,581 | B2 | 5/2019 | Ashcroft et al. |
| 2012/0305003 | A1 | 12/2012 | Mark |
| 2014/0004322 | A1* | 1/2014 | Kim ...................... B32B 38/04 156/256 |
| 2017/0011155 | A1 | 1/2017 | Ruto et al. |
| 2019/0061269 | A1 | 2/2019 | Messner |

FOREIGN PATENT DOCUMENTS

| CN | 106650124 A | 5/2017 |
| EP | 3503040 A1 | 6/2019 |
| KR | 10-1953985 B1 | 5/2019 |
| WO | 2016/169606 A1 | 10/2016 |

* cited by examiner

*Primary Examiner* — Michael J Brown
(74) *Attorney, Agent, or Firm* — Michael Dryja

(57) ABSTRACT

In some examples, a system receives data representing a beam-based lattice structure and a membrane to be placed on the beam-based lattice structure, and identifies intersections of beams of the beam-based lattice structure with the membrane. The system identifies locations for perforations in the membrane to form a perforated membrane, the identified locations excluding the identified intersections, and generates a representation of an object comprising the perforated membrane that includes the perforations at the identified locations.

14 Claims, 7 Drawing Sheets

PERFORATIONS IN A MEMBRANE FOR A LATTICE STRUCTURE

BACKGROUND

An additive manufacturing machine can be used to form a compressible lattice structure, such as a foam layer used in consumer and sporting goods, in vehicles, and so forth. Additive manufacturing machines produce three-dimensional (3D) objects by accumulating layers of build material, including a layer-by-layer accumulation and solidification of the build material patterned from computer aided design (CAD) models or other digital representations of physical 3D objects to be formed. A type of an additive manufacturing machine is referred to as a 3D printing system. Each layer of the build material is patterned into a corresponding part (or parts) of the 3D object.

BRIEF DESCRIPTION OF THE DRAWINGS

Some implementations of the present disclosure are described with respect to the following figures.

FIG. 3 is a block diagram of a storage medium storing machine-readable instructions according to some examples.

Figure 1:
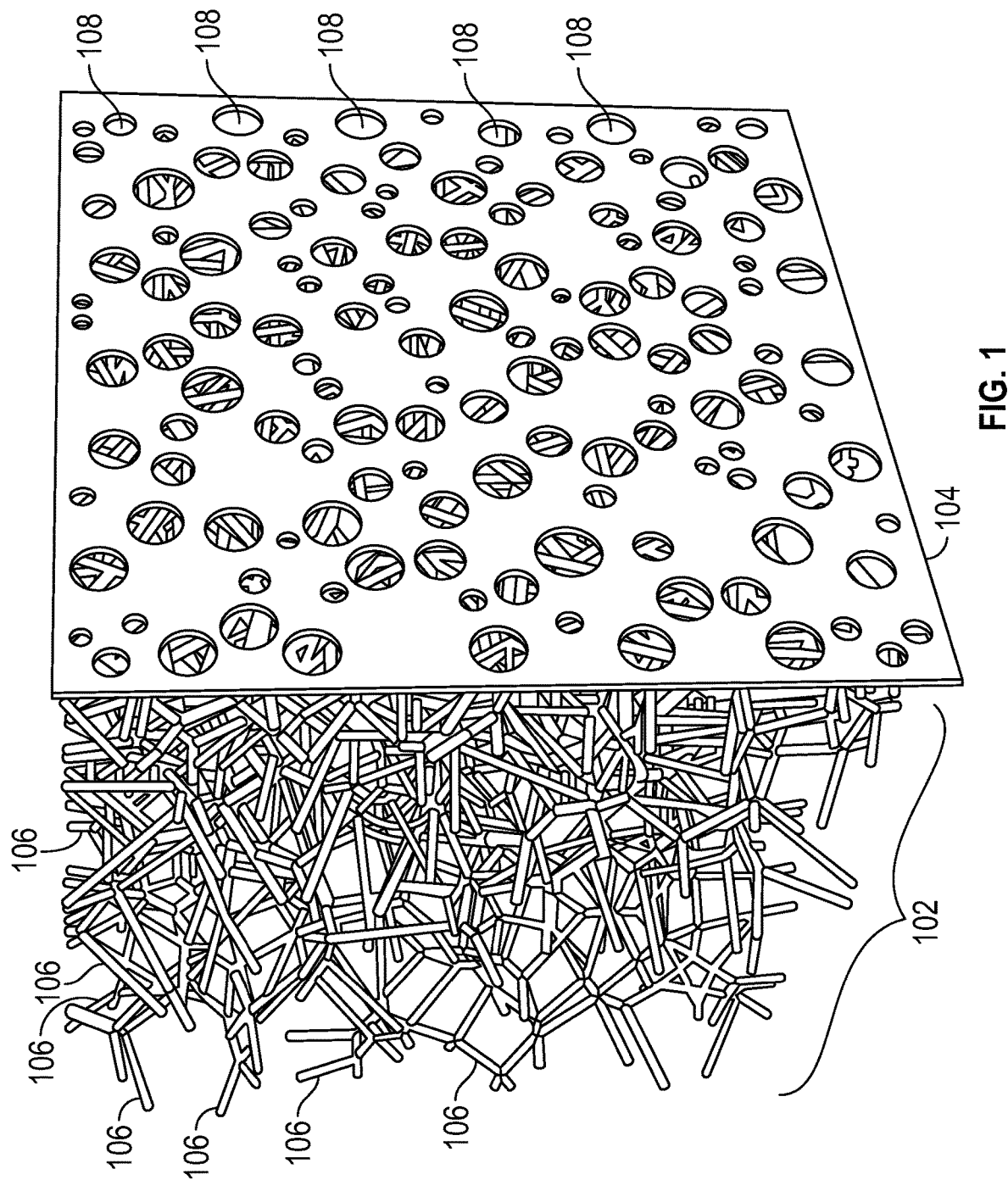
FIG. 1 is a schematic view of a portion of a beam-based lattice structure and a perforated membrane formed using techniques or mechanisms according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Using an additive manufacturing machine to build a compressible lattice structure can allow for better control of the compression response of the compressible lattice structure then typically possible with traditional manufacturing techniques. A lattice structure is compressible based on the material used to form the lattice structure, such as a thermoplastic polyurethane material or another elastomeric material.

In an example, a digital representation of the compressible lattice structure can be adjusted to change of properties of the compressible lattice structure, such as volumes within the lattice structure, and/or other properties.

As an example, by adjusting volumes within the compressible lattice structure based on use of an additive manufacturing machine, the compressible lattice structure can provide for better breathability than foam structures formed without the adjusted volumes. Fluid flow channels can be provided within the compressible lattice structure to allow for a flow of fluid, such as air or another gas or a liquid, through the fluid flow channels. In some applications, the fluid flow channels in the compressible lattice structure allows for enhanced user comfort. For example, an airflow through the compressible lattice structure can transfer heat away from where a user's skin touches the compressible lattice structure. As another example, the fluid flow channels can remove sweat away from the user's skin.

In some scenarios, a membrane is provided between a user and the compressible lattice structure to provide a more uniform contact area, than available at the surface of the compressible lattice structure. However, if the membrane is not properly perforated, the membrane can reduce the amount of airflow, which can reduce user comfort.

A lattice structure can be a beam-based lattice structure, in which beams are used to define a lattice arrangement. A "beam" can refer to a generally elongated member within the lattice structure. A lattice structure can include a uniform lattice, in which cells that make up the lattice are repeated throughout the entire lattice structure. In other examples, a lattice structure can include a stochastic lattice, which uses a random arrangement of beams.

To improve breathability in examples where membranes are applied to lattice structures, perforations can be formed in the membranes. A "perforation" refers to a hole that extends through the entire thickness of the membrane, such that a fluid can flow through the hole. A further example benefit of forming perforations in a membrane that is contacted to a lattice structure includes allowing more effective cleaning of an overall assembly including the lattice structure and the perforated membrane based on an ability of cleaning fluids to flow through the assembly. For example, powders, uncured resin, or other particulates can be removed more easily with a perforated membrane as compared to a membrane without perforations or with improperly positioned perforations.

There can be hundreds or thousands of contact points between the beams of the lattice structure and the membrane. An issue associated with forming perforations in a membrane that is physically contacted to a lattice structure is that, if not properly aligned, the perforations in the membrane may intersect with some beams of the lattice structure. If beams of the lattice structure intersect a perforation in the membrane, the intersecting beams may cause a partial (or even full) blockage of fluid flow through the perforation. If there are many intersections of beams of the lattice structure with perforations of the membrane, the result may be an overall reduction in the amount of fluid flow through the membrane. In some cases, a representation of a lattice structure can be generated algorithmically, such as for a stochastic lattice structure. As a result, a human designer would not know specifically how the beams of the lattice structure will be arranged, and thus it would be impractical for the designer to specify locations for the perforations in the membrane.

In accordance with some implementations of the present disclosure, a system receives data representing a beam-based lattice structure and a membrane to be placed on the beam-based lattice structure, identifies intersections of beams of the beam-based lattice structure with the membrane, and identifies locations for perforations in the membrane to form a perforated membrane, where the identified locations excluding the identified intersections. The system generates a representation of the beam-based lattice structure and the perforated membrane that includes the perforations at the identified locations. The representation of the beam-based lattice structure and the perforated membrane can then be used as part of an additive manufacturing process by an additive manufacturing machine to build a 3D object.

In some examples, the beam-based lattice structure can be a compressible lattice structure, such as one used in items for users. Items including compressible lattice structures can include a car seat, home furniture, clothing, bags, and so forth, which can come into contact with users. In other examples, compressible lattice structures can be used for non-user applications (an application in which the lattice structure is not intended to be used by humans). Moreover, lattice structures may be rigid instead of being compressible. Materials used to form lattice structures can include any or some combination of the following: polymer, metal, ceramic, glass, and so forth.

In other examples, the lattice structure can be non-compressible.

A membrane provided on a lattice structure can be formed of any or some combination of the following materials: polymer, ceramic, metal, and so forth. In some example, the membrane and the lattice structure can be built by an additive manufacturing machine as a single object. In other examples, the membrane can be built separately from the lattice structure, and then the membrane can be attached to the lattice structure.

Although reference is made to forming a lattice structure and a membrane using an additive manufacturing machine, it is noted that techniques or mechanisms according to some implementations can be built using other types of manufacturing machines, such as a laser cutting machine, a computer numerical control (CNC) machine, and so forth.

FIG. 1 is a perspective view of a portion of an assembly that includes a beam-based lattice structure 102 and a perforated membrane 104 that is physically contacted to a surface of the lattice structure 102. Some of the perforations of the perforated membrane 104 are labelled with the reference numeral 108.

Although FIG. 1 shows the perforated membrane 104 as being provided just on one surface of the lattice structure 102, it is noted that in other examples, the perforated membrane 104 can be provided on multiple surfaces of the lattice structure 102. In some examples, the perforated membrane 104 can even fully wrap around the exterior surface(s) of the lattice structure 102.

The beam-based lattice structure 102 includes various beams (with some of the beams identified with reference numeral 106). The beams are connected to one another in a generally lattice-like arrangement to form the lattice structure 102. In some examples, the lattice structure 102 is a stochastic lattice structure, which includes a random arrangement of beams. In other examples, the lattice structure 102 is a uniform lattice structure, which includes repeating cells throughout the lattice structure, or in a portion of the lattice structure (such as the portion that provides the outermost surface of the lattice structure 102). A "cell" of a uniform lattice structure includes an arrangement of beams. The cell is repeated throughout the entire lattice structure or a portion of the lattice structure, such that a uniform arrangement of beams is provided in the lattice structure.

The assembly depicted in FIG. 1 can be built using an additive manufacturing machine.

The beam-based lattice structure 102 includes fluid flow channels, and the perforations 108 in the perforated membraned 104 are aligned with the fluid flow channels to provide fluid flow through the perforations and the fluid flow channels.

An additive manufacturing machine such as a 3D printing system can use a build material, such as a powdered build material composed of particles in the form of fine powder or granules, to build a 3D object. The powdered build material can include metal particles, plastic particles, polymer particles, ceramic particles, glass particles, or particles of other powder-like materials. In some examples, a build material powder may be formed from, or may include, short fibers that may, for example, have been cut into short lengths from long strands or threads of material.

In some examples of additive manufacturing machines, as part of the processing of each layer of build material, liquid agents can be dispensed by liquid agent dispensers (such as through a printhead or another fluid dispensing device) into a layer of build material. In examples where the build material is a non-metallic build material such as plastic or polymer, the applied liquid agents can include a fusing agent (which is a form of an energy absorbing agent) that absorbs heat energy emitted from an energy source used in the additive manufacturing process. For example, after a layer of build material is deposited onto a build platform (or onto a previously formed layer of build material) in the additive manufacturing machine, a fusing agent with a target pattern can be deposited on the layer of build material. The target pattern can be based on an object model (or more generally, a digital representation) of the physical 3D object that is to be built by the additive manufacturing machine.

If a metallic powdered build material is used, then an additive manufacturing machine can apply a binder agent (which is another form of a liquid agent) to layers of powdered metal build material such that the binder agent is applied to selected portions of each layer. In some examples, the binder agent can include a liquid functional agent (LFA), which may be a water-based binder agent that includes latex, solvents, and surfactants. Alternatively, the binder agent can include a pre-wetting liquid that can be applied to promote or inhibit infiltration of another binder agent. As each layer of the powdered metal build material is deposited, a binder agent can subsequently be dispensed by liquid agent dispensers (such as through a printhead or another fluid dispensing device) to the layer. Portions of the powdered metal build material where the binder agent is applied are bound together by the binder agent. The binder agent can include an ultraviolet-curable binder agent, heat-curable binder agent, and so forth. After the layers of powdered metal build material have been deposited and the binder agent has been applied to locations of each layer of the powdered metal build material, curing (e.g., based on application of heat or ultraviolet light in the additive manufacturing machine) of the binder agent in the layers of the powdered metal build material produces a so-called "green part." The green part is de-powdered to remove any external unbound build material powder. Afterwards, the green part can be transferred to an oven, where the binder agent can be decomposed from a thermal process, and where the bound build material powder (e.g., metal particles, etc.) are sintered together to form a highly dense 3D object. Sintering refers to coalescing powdered particles to form a solid mass with a higher density than the green part.

In further examples, an additive manufacturing machine can include a selective laser melting (SLM) or selecting laser sintering (SLS) printer, which employs a laser-based fabrication technique that does not involve dispensing of liquid agents (e.g., the fusing agent or binder agent discussed above).

Figure 2:
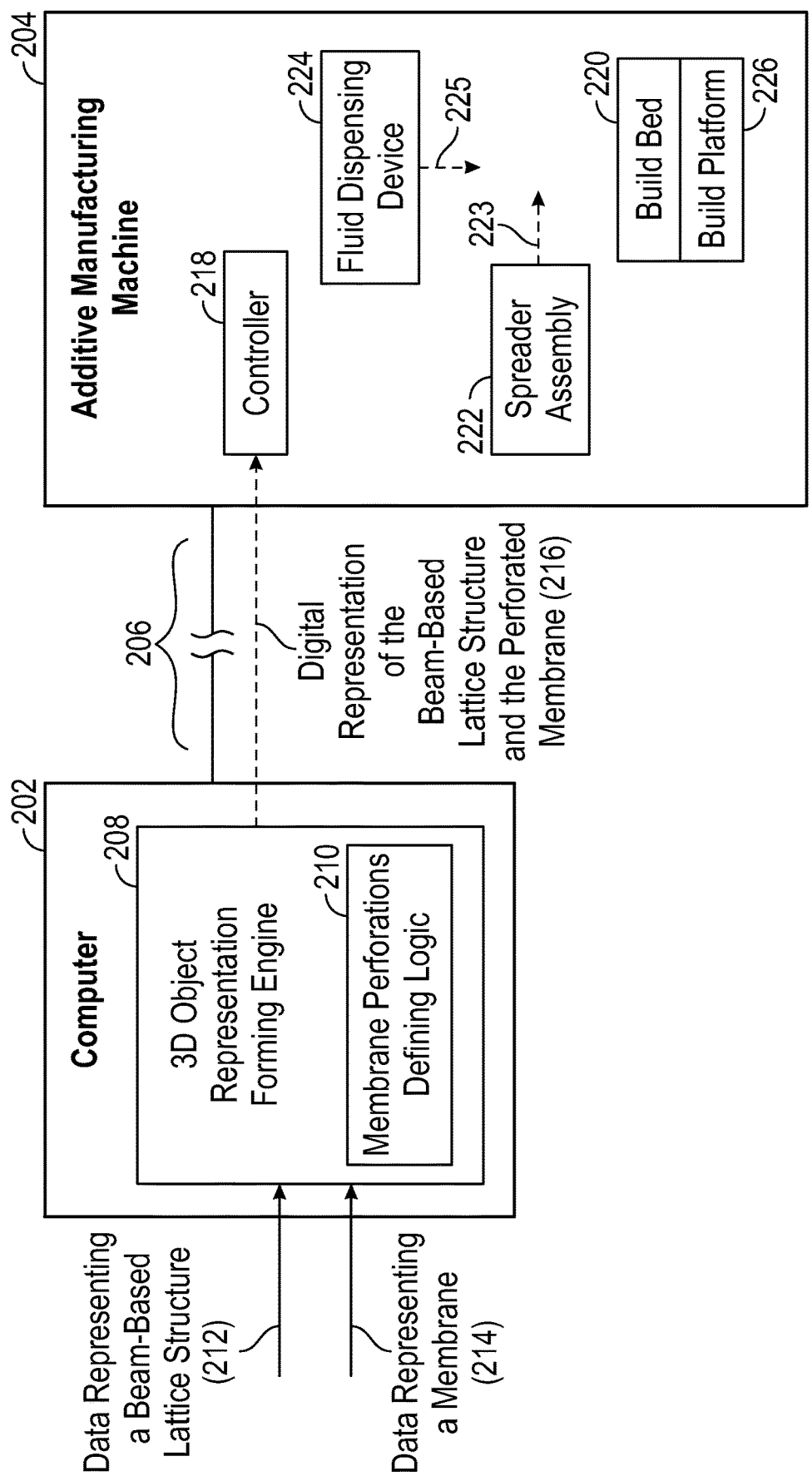
FIG. 2 is a block diagram of an example arrangement that includes a computer and an additive manufacturing machine, according to some examples.

FIG. 2 is a block diagram of an example arrangement that includes a computer 202 and an additive manufacturing machine 204 (or alternatively, another type of manufacturing machine). Although the computer 202 is separate from the additive manufacturing machine 204 in some examples, it is noted that the computer 202 can be part of the additive manufacturing machine 204 in other examples. In the latter examples, the computer 202 can be implemented as a controller in the additive manufacturing machine 204. In examples where the computer 202 is separate from the additive manufacturing machine 204, the computer 202 is able to communicate with the additive manufacturing machine 204 over a communications link 206, such as a network, a short-range wireless link, and so forth.

The computer 202 includes a 3D object representation forming engine 208 that forms a digital representation of a 3D object for use by the additive manufacturing machine 204 in building a 3D object.

As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

The 3D object representation forming engine 208 includes a membrane perforations defining logic 210 for identifying locations of perforations in a membrane that is to be attached to a lattice structure, such as to form the assembly shown in FIG. 1. The membrane perforations defining logic 210 can be part of the hardware processing circuit of the 3D object representation forming engine 208, or can be part of the machine-readable instructions of the 3D object representation forming engine 208. In other examples, the membrane perforations defining logic 210 can be separate from the 3D object representation forming engine 208.

The 3D object representation forming engine 208 receives data (212) representing a beam-based lattice structure and data (214) representing a (un-perforated) membrane to be placed on the beam-based lattice structure.

The membrane perforations defining logic 210 identifies intersection points at which beams of the beam-based lattice structure intersects with the membrane. Based on the identified intersection points, the membrane perforations defining logic 210 identifies locations for perforations in the membrane to form a perforated membrane. The identified locations for the perforations in the membrane excludes the identified intersection points, so as to prevent intersection of beams of the beam-based lattice structure with the perforations.

The 3D object representation forming engine 208 generates a digital representation (216) of the beam-based lattice structure and the perforated membrane that includes the perforations at the identified locations. The digital representation (216) of the beam-based lattice structure and the perforated membrane is provided to the additive manufacturing machine 204, which builds a 3D object including an assembly that includes the beam-based lattice structure and the perforated membrane.

The additive manufacturing machine 204 includes a controller 218 that can be used to control an additive manufacturing process in the additive manufacturing machine 204 for building a 3D object. As used here, a "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

The controller 218 receives the digital representation (216) of the beam-based lattice structure and the perforated membrane generated by the 3D object representation forming engine 208, and the controller 218 controls an additive manufacturing process according to the digital representation 216 to build a 3D object including the assembly that includes the beam-based lattice structure and the perforated membrane.

An additive manufacturing process includes the spreading of a layer of a powdered build material across a build bed 220 by a spreader assembly 222, and the dispensing of a liquid agent by a fluid dispensing device 224. The controller 218 is able to control an operation of the spreader assembly 222, the fluid dispensing device 224, and other components (e.g., heaters, etc.) that are not shown.

Initially, before a 3D build operation has started, the build bed 220 includes the upper surface of a build platform 226 in the additive manufacturing machine 204. After build material layers have been spread over the build platform 226 and processed on a layer-by-layer basis, the build bed 220 would include any previously formed part(s) of the 3D object based on the previously processed build material layer(s). More generally, a "build bed" refers to a structure onto which a build material layer can be spread for processing, where the structure can include just the upper surface of the build platform 226, or alternatively, can further include any previously formed part(s) of a 3D object.

The spreader assembly 222 is used to spread a powdered build material across the build bed 220. The spreader assembly 222 (including a roller, a blade, etc.) is moveable in a spread direction 223 (along a spread axis) to spread the powdered build material from a supply of the powdered build material across the build bed 220. In further examples, the spreader assembly 222 is moveable in multiple spread directions (along multiple respective spread axes) to spread a powdered build material across the build bed 220.

After a layer of powdered build material has been spread across the build bed 220 by the spreader assembly 222, the fluid dispensing device 224 is used to dispense a liquid agent to selected portions of the layer of powdered build material. The fluid dispensing device 224 (e.g., a printhead) includes nozzles to dispense the liquid agent (such as generally in a downward direction 225 in the view shown in FIG. 2) to a layer of build material that is part of the build bed 220. In other examples, the additive manufacturing machine 204 can include multiple fluid dispensing devices 224.

In some examples, the fluid dispensing device 224 can be mounted to a moveable carriage (not shown) in the additive manufacturing machine 204. During a build process, the carriage can move back and forth to move the fluid dispensing device 224 along a scan axis, to dispense liquid agents to the layer of build material during a build operation. In other examples, the fluid dispensing device 224 can be moved along multiple different scan axes.

The layers processed by the additive manufacturing machine 204 based on the digital representation 216 includes layers of the beam-based lattice structure and layers of the perforated membrane as represented by the digital representation 216.

FIGS. 3A-3D illustrate a process performed by the membrane perforations defining logic 210 in the computer 202 (FIG. 2) to identify locations for perforations in a membrane 302.

Based on the data (212) representing a beam-based lattice structure and the data (214) representing the (un-perforated) membrane to be placed on the beam-based lattice structure, the membrane perforations defining logic 210 identifies intersection points at which the beams of the beam-based lattice structure intersect the membrane 302. The intersection points are identified with an "X" in FIG. 3A. The intersections between the beams and the membrane 302 are at points where the beams interact physically with the membrane 302 (i.e., at points where there is physical touching between the beams and the membrane 302).

Based on the data (212) representing the beam-based lattice structure, the membrane perforations defining logic 210 can identify a start point and an end point of each beam in the beam-based lattice structure. A start point and an end point refer to geometric points in a 3D space containing the beam-based lattice structure. For example, the data (212) representing the beam-based lattice structure can define the beams using respective pairs of geometric points that represent a respective start point and end point. In other examples, the data (212) representing the beam-based lattice structure can be a graphical representation of the beams of the beam-based lattice structure.

Based on the intersection points (identified by "X" in FIG. 3A), the membrane perforations defining logic 210 can use triangulation to identify triangles that connect the intersection points. For example, the triangulation can include Delaunay triangulation, such as a 2D Delaunay triangulation (performed in a 2D space) or a 3D Delaunay triangulation (performed in a 3D space). As another example, the triangulation can include Voronoi tessellation.

Figure 3A:
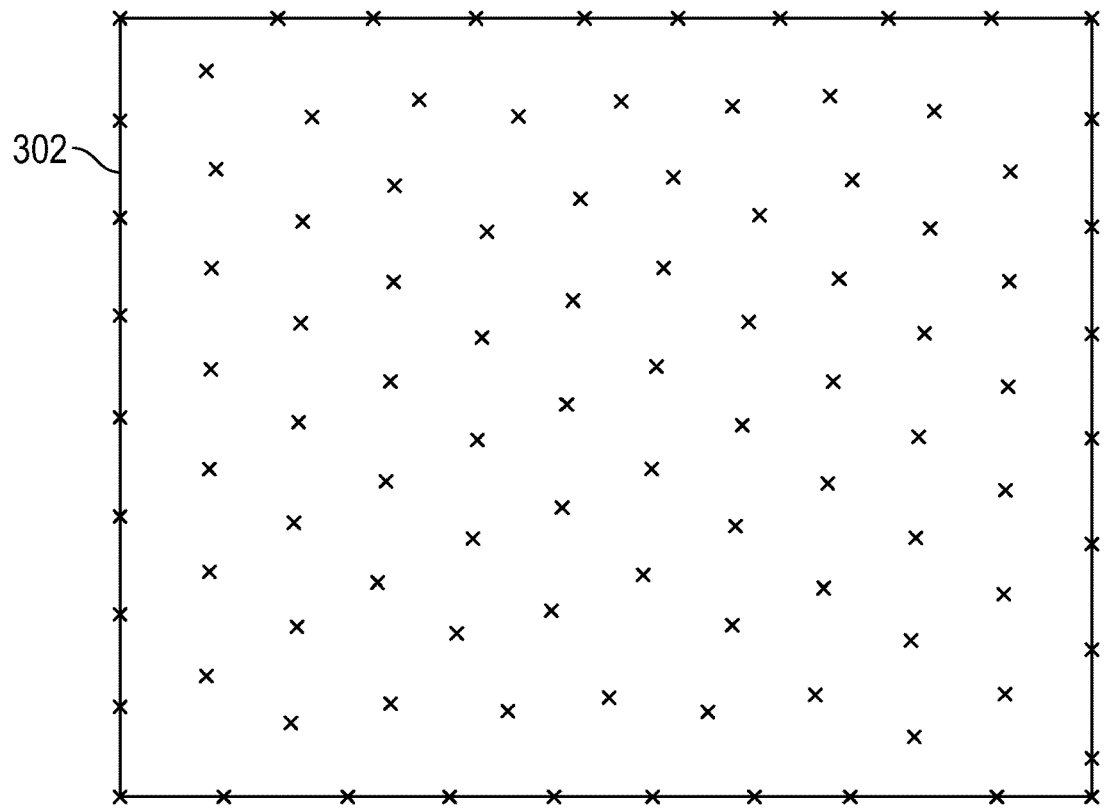
FIGS. 3A-3D illustrate a process of defining perforations in a membrane, according to some examples.

Although FIG. 3A shows the intersection points as being part of a single plane, it is noted that the intersection points can actually exist in multiple planes in a 3D space.

FIGS. 3A-3D illustrate intersection points in a single 2D plane for ease of explanation. Techniques or mechanisms according to some implementations of the present disclosure for identifying locations for perforations can be extended to intersection points in 3D space, such as based on use of 3D Delaunay triangulation.

Figure 3B:
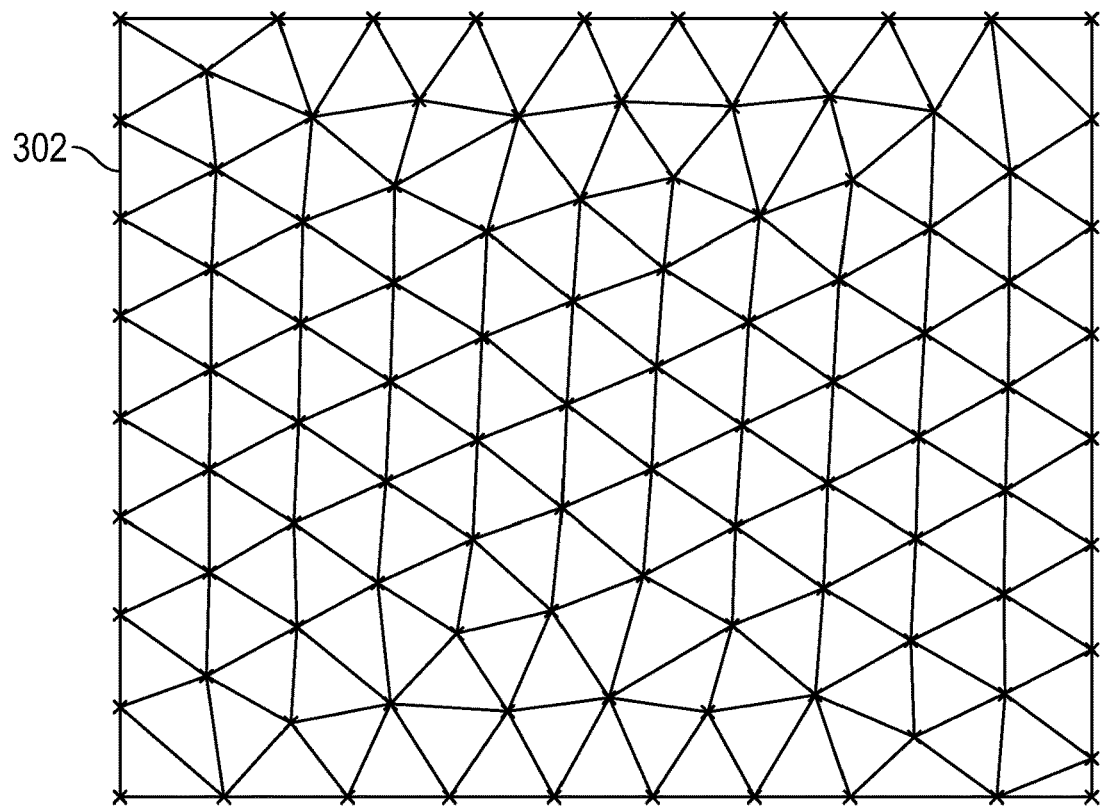

FIG. 3B shows triangles formed by connecting the intersection points (each represented by an "X" in FIG. 3B). If a Delaunay triangulation is used, each of the triangles is generated from a circumcircle (or circumsphere in the 3D case) based on three distinct original intersection points. For these circumcircles (or circumspheres) to be valid, each circumcircle (or circumsphere) does not enclose any intersection point. As a result, each triangle that is defined does not contain any intersection point. Thus, each triangle defines a region on the external surface of the membrane 302 where a perforation can be created.

The membrane perforations defining logic 210 fits incircles into respective triangles. An incircle is an inscribed circle of a polygon (which in the present examples is a triangle); the circle is located completely within the triangle and is tangent to each of the triangle's sides.

Figure 3C:
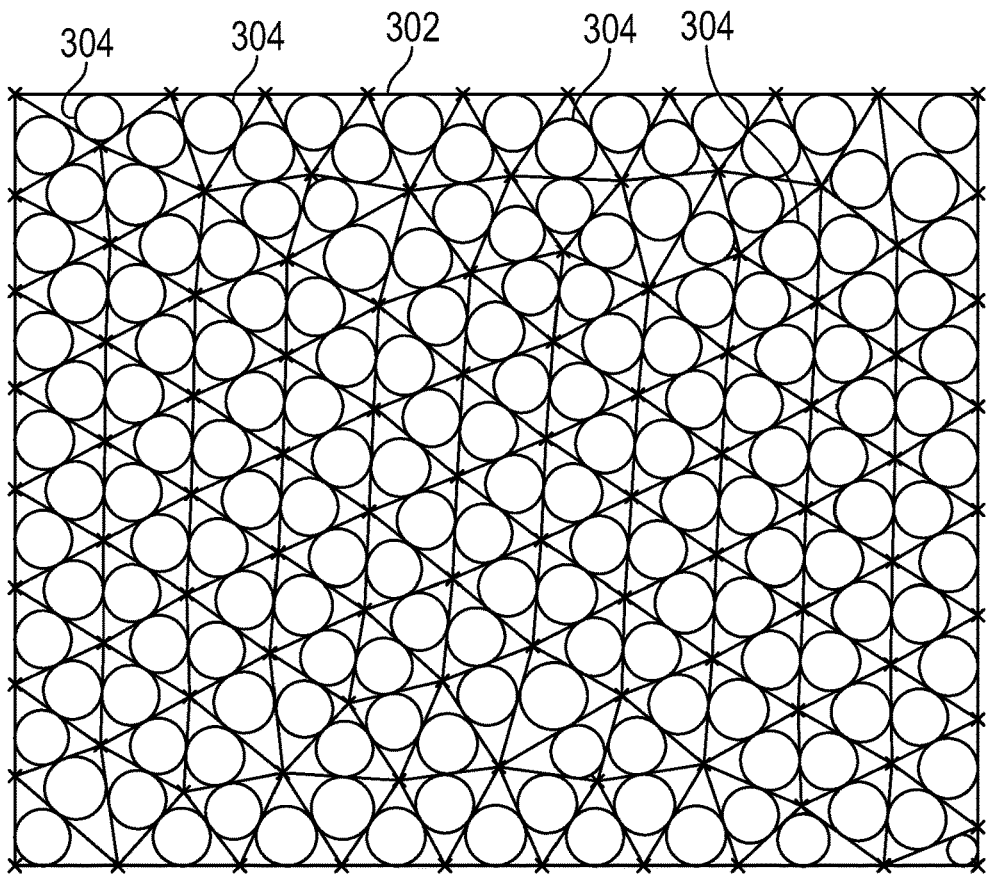

As shown in FIG. 3C, an incircle that is fitted into each triangle is the largest circle contained within the respective triangle. In some examples, incircles can be fitted into all of the triangles defined by the intersection points on the membrane 302. In other examples, incircles can be fitted into some of the triangles defined by the intersection points on the membrane 302.

To improve the structural integrity of the membrane 302, the radius of each incircle 304 can be reduced by a specified amount such that connecting portions can be formed in the membrane 302 to allow for structural integrity of the membrane 302. The reduction of the incircles produces reduced radius circles 306 as shown in FIG. 3D, in which each reduced radius circle 306 is spaced apart from the sides of the triangle in which the reduced radius circle 306 is located, such that a specified gap is provided each reduced radius circle 306 and the corresponding sides of the respective triangle.

The reduced radius circles 306 represent the locations where perforations are to be formed in the membrane 302. The perforations formed can have the general size represented by the reduced radius circles 306. Each reduced radius circle generally defines the center and maximal radius of each perforation.

Figure 3D:
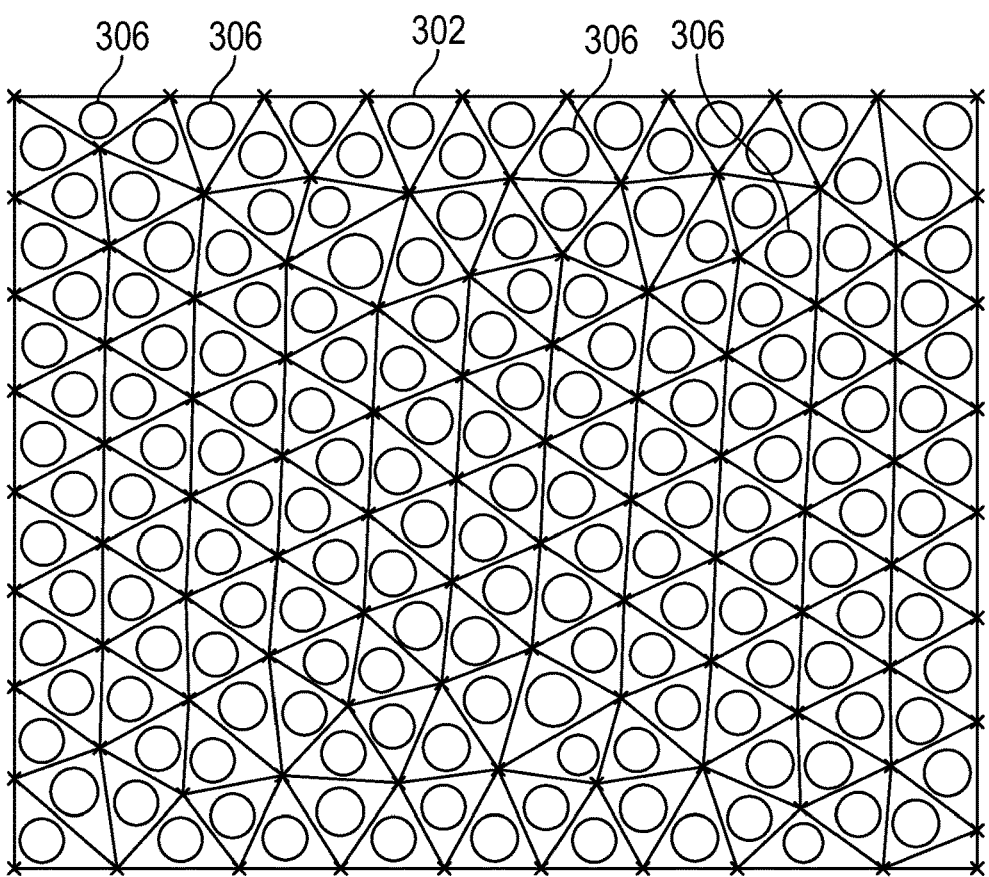
Figure 4A:
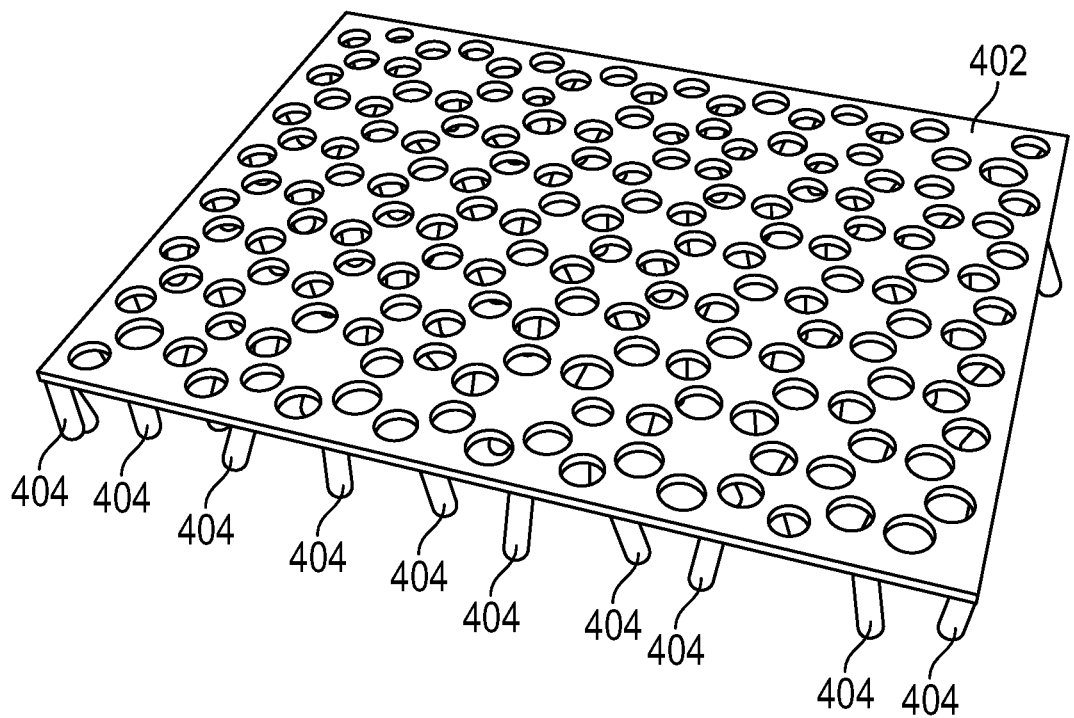
FIG. 4A is a top perspective view of a portion of an assembly including a beam-based lattice structure and a perforated membrane formed according to some examples.

FIG. 4A depicts a top perspective view of an assembly including a perforated membrane 402 formed by forming perforations according to the reduced radius circles 306 of FIG. 3D. The external surface of the perforated membrane 402 is visible in FIG. 4A. Some beams 404 of the lattice structure that are in physical contact with the perforated membrane 402 are shown in FIG. 4A.

Figure 4B:
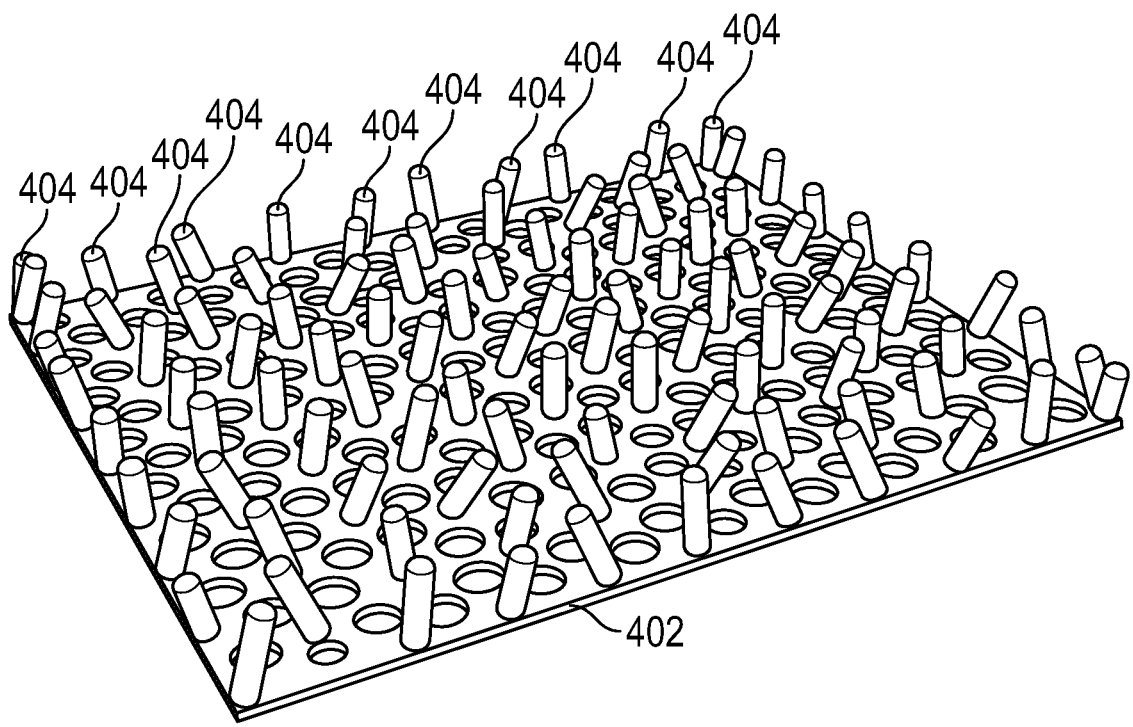
FIG. 4B is a bottom perspective view of a portion of the assembly including a beam-based lattice structure and a perforated membrane formed according to some examples.

FIG. 4B is a bottom perspective view that shows beams 404 contacting an inside surface of the perforated membrane 402.

Figure 5:
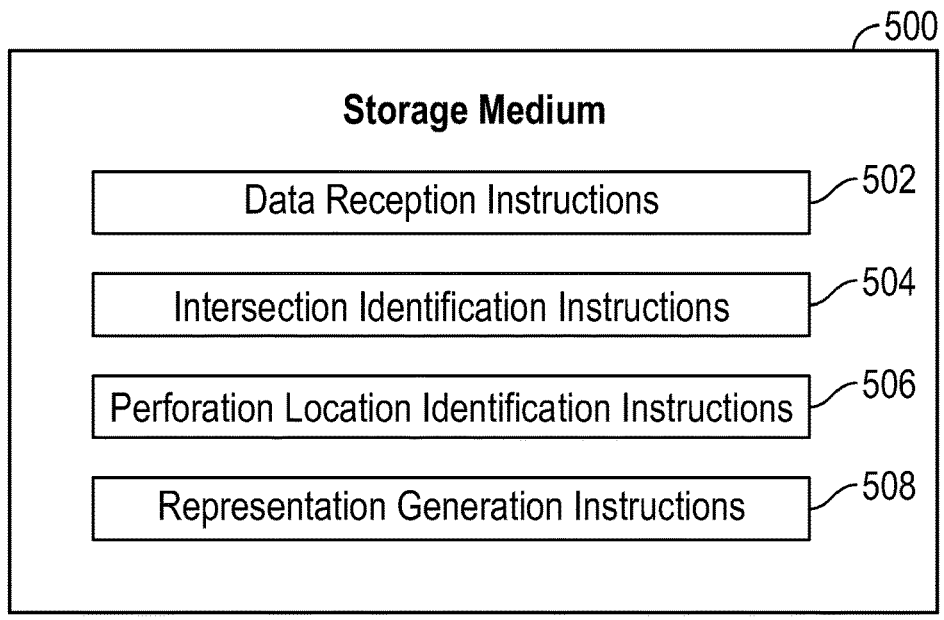
FIG. 5 is a block diagram of a storage medium storing machine-readable instructions according to some examples.

FIG. 5 is a block diagram of a non-transitory machine-readable or computer-readable storage medium 500 storing machine-readable instructions that upon execution cause a system to perform various tasks. The system can include the computer 202, for example.

The machine-readable instructions include data reception instructions 502 to receive data (e.g., 212 and 214 in FIG. 2) representing a beam-based lattice structure and a membrane to be placed on the beam-based lattice structure.

The machine-readable instructions include intersection identification instructions 504 to identify intersections of beams of the beam-based lattice structure with the membrane. The intersections are at points of physical interaction between the beam-based lattice structure and the membrane.

The machine-readable instructions include perforation location identification instructions 506 to identify locations for perforations in the membrane to form a perforated membrane, the identified locations excluding the identified intersections. In some examples, the identifying of the locations for the perforations in the perforated membrane uses triangulation to identify triangles that connect intersection points. The identified locations for the perforations are inside the triangles. In some examples, a specified gap is defined between a perforation of the perforations and sides of a respective triangle, such as by reducing the radius of a circle fitted within each triangle.

The machine-readable instructions include representation generation instructions 508 to generate a representation of an object including the perforated membrane that has the perforations at the identified locations. In some examples, the generated representation can be of the object that includes both the beam-based lattice structure and the perforated membrane. In other examples, the generated representation can be of the object that includes the perforated membrane without the beam-based lattice structure; in such latter examples, the perforated membrane is to be applied to a beam-based lattice structure by the manufacturing machine.

In some examples, the machine-readable instructions further include machine-readable instructions to provide, to a manufacturing machine (e.g., an additive manufacturing machine or another manufacturing machine, the representation for building of the beam-based lattice structure and the perforated membrane placed on the beam-based lattice structure.

Figure 6:
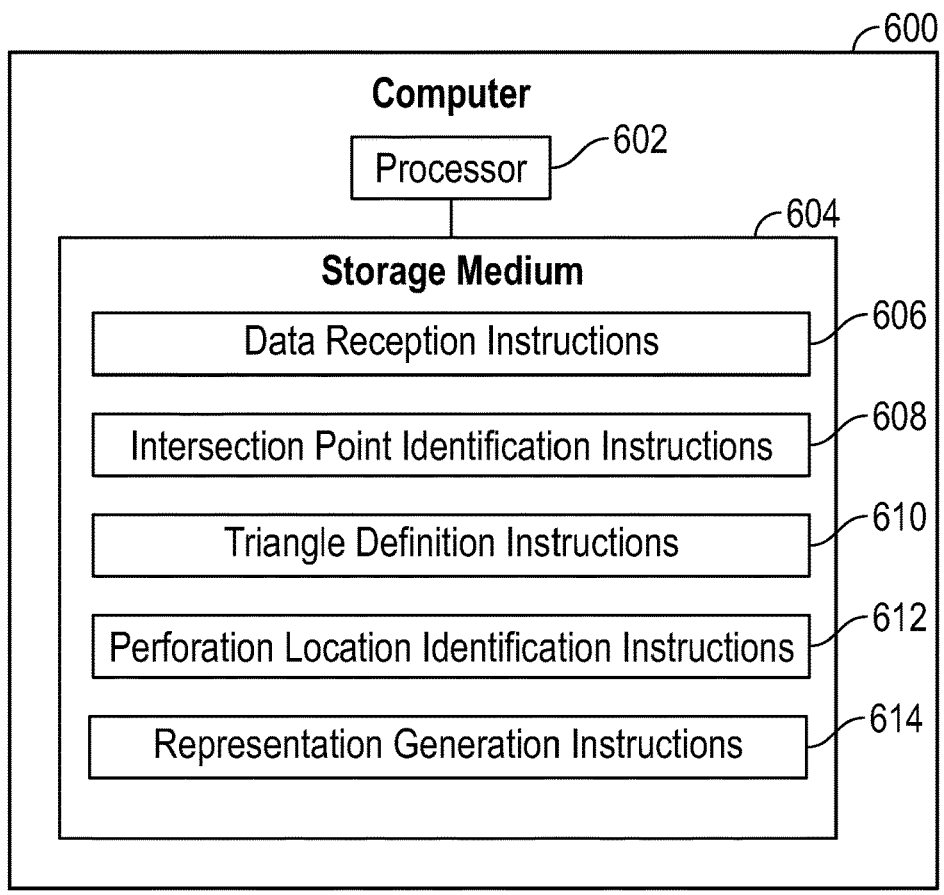
FIG. 6 is a block diagram of a computer according to some examples.

FIG. 6 is a block diagram of computer 600 that includes a hardware processor 602 (or multiple hardware processors). A hardware processor can include a microprocessor, a core of a multi-core microprocessor, a microcontroller, a programmable integrated circuit, a programmable gate array, or another hardware processing circuit.

The computer 600 includes a storage medium 604 that stores machine-readable instructions executable on the hardware processor 602 to perform various tasks. Machine-readable instructions executable on a hardware processor can refer to the instructions executable on a single hardware processor or the instructions executable on multiple hardware processors.

The machine-readable instructions include data reception instructions 606 to receive data (e.g., 212, 214 in FIG. 2) representing a beam-based lattice structure and a membrane to be placed on the beam-based lattice structure.

The machine-readable instructions include intersection point identification instructions 608 to identify intersection points of beams of the beam-based lattice structure with the membrane when contacted to the beam-based lattice structure.

The machine-readable instructions include triangle definition instructions 610 to define triangles connecting the intersection points.

The machine-readable instructions include perforation location identification instructions 612 to identify locations for perforations in the membrane to form a perforated membrane, the identified locations being within the triangles. In some examples, the identifying of the locations for the perforations includes defining circles inside the triangles, where each circle has a radius that is reduced from a radius of a maximum sized circle (e.g., the incircles 304 shown in FIG. 3C) that can fit in a respective triangle.

The machine-readable instructions include representation generation instructions 614 to generate a representation of an object including the perforated membrane that has the perforations at the identified locations.

In some examples, the machine-readable instructions further include machine-readable instructions to provide, to a manufacturing machine, the representation for building of the beam-based lattice structure and the perforated membrane placed on the beam-based lattice structure.

Figure 7:
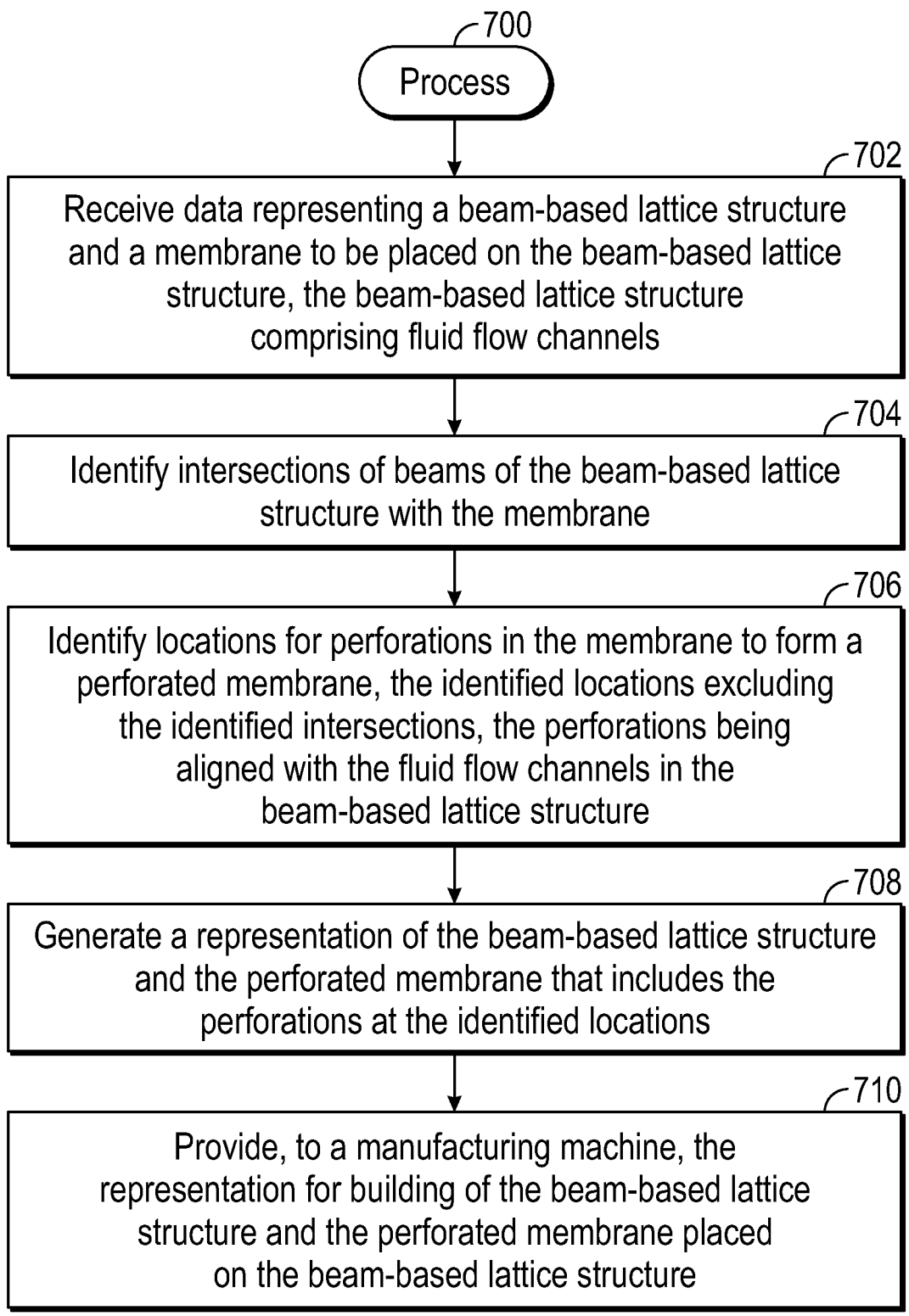
FIG. 7 is a flow diagram of a process according to some examples.

FIG. 7 is a flow diagram of a process 700 according to some examples. The process 700 can be performed by the computer 202 or the computer 600, for example.

The process 700 includes receiving (at 702) data representing a beam-based lattice structure and a membrane to be placed on the beam-based lattice structure, the beam-based lattice structure comprising fluid flow channels.

The process 700 includes identifying (at 704) intersections of beams of the beam-based lattice structure with the membrane.

The process 700 includes identifying (at 706) locations for perforations in the membrane to form a perforated membrane, the identified locations excluding the identified intersections, the perforations being aligned with the fluid flow channels in the beam-based lattice structure.

The process 700 includes generating (at 708) a representation of the beam-based lattice structure and the perforated membrane that includes the perforations at the identified locations.

The process 700 includes providing (at 710), to a manufacturing machine, the representation for building of the beam-based lattice structure and the perforated membrane placed on the beam-based lattice structure.

A storage medium (e.g., 500 in FIG. 5 or 604 in FIG. 6) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a computer to:
   receive data representing a beam-based lattice structure and a membrane to be placed on the beam-based lattice structure;
   identify intersections of beams of the beam-based lattice structure with the membrane;
   identify locations for perforations in the membrane to form a perforated membrane, the identified locations excluding the identified intersections;
   generate a representation of an object comprising the perforated membrane that includes the perforations at the identified locations; and
   ultimately provide, to an additive manufacturing machine, the representation for building of the beam-based lattice structure and the perforated membrane placed on the beam-based lattice structure.

2. The non-transitory machine-readable storage medium of claim 1, wherein the intersections are at points of physical interaction between the beam-based lattice structure and the membrane once the beam-based lattice structure and the membrane are built.

3. The non-transitory machine-readable storage medium of claim 1, wherein the beam-based lattice structure comprises fluid flow channels, and the perforations in the perforated membrane are aligned with the fluid flow channels to provide fluid flow through the perforations and the fluid flow channels.

4. The non-transitory machine-readable storage medium of claim 1, wherein the beam-based lattice structure is a stochastic beam-based lattice structure comprising a random arrangement of the beams.

5. The non-transitory machine-readable storage medium of claim 1, wherein the beam-based lattice structure is a uniform beam-based lattice structure with a uniform arrangement of the beams.

6. The non-transitory machine-readable storage medium of claim 1, wherein the intersections are at intersection points on the membrane, and wherein the identifying of the locations for the perforations in the perforated membrane uses triangulation to identify triangles that connect the intersection points.

7. The non-transitory machine-readable storage medium of claim 6, wherein the triangulation comprises Delaunay triangulation.

8. The non-transitory machine-readable storage medium of claim 6, wherein each triangle of the triangles identified by the triangulation does not enclose any of the intersection points.

9. The non-transitory machine-readable storage medium of claim 6, wherein the identified locations for the perforations are inside the triangles.

10. The non-transitory machine-readable storage medium of claim 9, wherein the instructions upon execution cause the computer to:
define a specified gap between a perforation of the perforations and sides of a respective triangle of the triangles.

11. A computer comprising:
a processor; and
a non-transitory storage medium storing instructions executable by the processor to:
receive data representing a beam-based lattice structure and a membrane to be placed on the beam-based lattice structure;
identify intersection points of beams of the beam-based lattice structure with the membrane when contacted to the beam-based lattice structure;
define triangles connecting the intersection points;
identify locations for perforations in the membrane to form a perforated membrane, the identified locations being within the triangles;
generate a representation of an object comprising the perforated membrane that includes the perforations at the identified locations; and
ultimately provide, to an additive manufacturing machine, the representation for building of the beam-based lattice structure and the perforated membrane placed on the beam-based lattice structure.

12. The computer of claim 11, wherein the identifying of the locations for the perforations comprises defining circles inside the triangles, each circle of the circles having a radius that is reduced from a radius of a maximum sized circle that can fit in a respective triangle of the triangles.

13. A method performed by a computer and comprising:
receiving data representing a beam-based lattice structure and a membrane to be placed on the beam-based lattice structure, the beam-based lattice structure comprising fluid flow channels;
identifying intersections of beams of the beam-based lattice structure with the membrane;
identifying locations for perforations in the membrane to form a perforated membrane, the identified locations excluding the identified intersections, the perforations being aligned with the fluid flow channels in the beam-based lattice structure;
generating a representation of the beam-based lattice structure and the perforated membrane that includes the perforations at the identified locations; and
providing, to an additive manufacturing machine, the representation for building of the beam-based lattice structure and the perforated membrane placed on the beam-based lattice structure.

14. The method of claim 13, wherein the intersections are at intersection points on the membrane, and wherein the identifying of the locations for the perforations in the perforated membrane comprises:
using triangulation to identify triangles that connect intersection points, and
defining circles within the triangles, the circles representing the perforations.

* * * * *